United States Patent [19]
Alderson et al.
[11] 4,192,337
[45] Mar. 11, 1980

[54] PRIORITY FLOW VALVE

[75] Inventors: Loren L. Alderson, Nickerson, Kans.; Delbert E. Truesdell, Conover, Ohio
[73] Assignee: The Cessna Aircraft Company, Wichita, Kans.

[21] Appl. No.: 931,701
[22] Filed: Aug. 7, 1978
[51] Int. Cl.[2] G05D 11/02
[52] U.S. Cl. 137/101; 137/118; 137/568; 60/413; 60/420
[58] Field of Search 60/404, 413, 420, 422; 137/101, 117, 118, 568

[56] References Cited

U.S. PATENT DOCUMENTS

| | | | |
|---|---|---|---|
| 3,165,113 | 1/1965 | Schultz | 137/101 |
| 3,353,495 | 11/1967 | Bianchetta | 60/413 |
| 3,841,095 | 10/1974 | Baker | 60/404 |
| 3,979,908 | 9/1976 | Alderson | 60/422 |
| 4,057,073 | 11/1977 | Adams | 60/422 |
| 4,131,125 | 12/1978 | Tanguy | 137/118 |
| 4,149,379 | 4/1979 | Shimizu | 60/404 |

*Primary Examiner*—William R. Cline
*Assistant Examiner*—H. Jay Spiegel

[57] ABSTRACT

An improvement to a priority valve which provides priority flow to a priority function, not only directly from a fluid power source, but also from an accumulator when the priority demand exceeds the output of the fluid power source. This priority flow valve also provides flow to one or more secondary functions when the priority flow requirements are satisfied or when the priority flow path is blocked.

5 Claims, 3 Drawing Figures

PRIORITY FLOW VALVE

BACKGROUND OF THE INVENTION

This valve provides independently actuatable outputs with condition responsive means insuring sufficiency of fluid feed to a priority function.

In a hydraulic system serving multiple functions, it is usually impracticable to use a pump large enough to supply a maximum possible demand of the system. It is, therefore, sometimes necessary to provide an order of priority to insure adequate flow to a certain function which requires precedence, such as a steering function of a mobile unit. An example of a priority flow valve which supplies such priority flow to a priority function and secondary flow to a secondary function, when the priority flow requirements are satisfied or the priority flow path is blocked, is described in U.S. Pat. No. 3,979,908 granted to Loren L. Alderson, a joint inventor of the present invention. The priority flow valve described in U.S. Pat. No. 3,979,908 requires a pump having a capacity at least equal to maximum demand of the priority function, even when such peak demands are of short duration. A smaller pump can satisfy short term priority peaks if supplemented by stored power from an accumulator. The present invention is a priority flow valve which can use such stored power, when necessary, thus permitting a smaller pump to serve a system having short term priority demand peaks.

SUMMARY OF THE INVENTION

The gist of this improvement to the priority flow valve described in U.S. Pat. No. 3,979,908 is an additional land and port. The land forms an additional annular groove which connects not only with a priority function port but conditionally with the additional port to which an accumulator is connected so that stored power can be provided to the priority function when advantageous.

The valve is arranged so that there are three principal positions of its spool: first, an extreme priority demand position which directs entire flow from a pump plus fluid stored in the accumulator to the priority function; second, a normal priority demand position which directs the entire flow from the pump, but none from the accumulator, to the priority function; and third, a no-priority position which directs the entire flow from the pump to a secondary function. Intermediate positions between the first and second principal positions meter sufficient flow from the accumulator to satisfy demand of the priority function. Intermediate positions between the second and third principal positions meter to the secondary function flow beyond that demanded by the priority function.

The object of the present invention is to provide a priority flow valve which not only diverts flow from the secondary function to the priority function upon demand but will also, whenever the full flow from the pump is inadequate for a peak short term demand of the priority function, provide supplemental flow from an accumulator to the priority function.

Thus, with the present invention, it is not necessary to provide a pump large enough to handle the peak demands of the priority when such demands can be reduced by an accumulator.

DESCRIPTION OF THE PREFERRED EMBODIMENT

Figure 1:
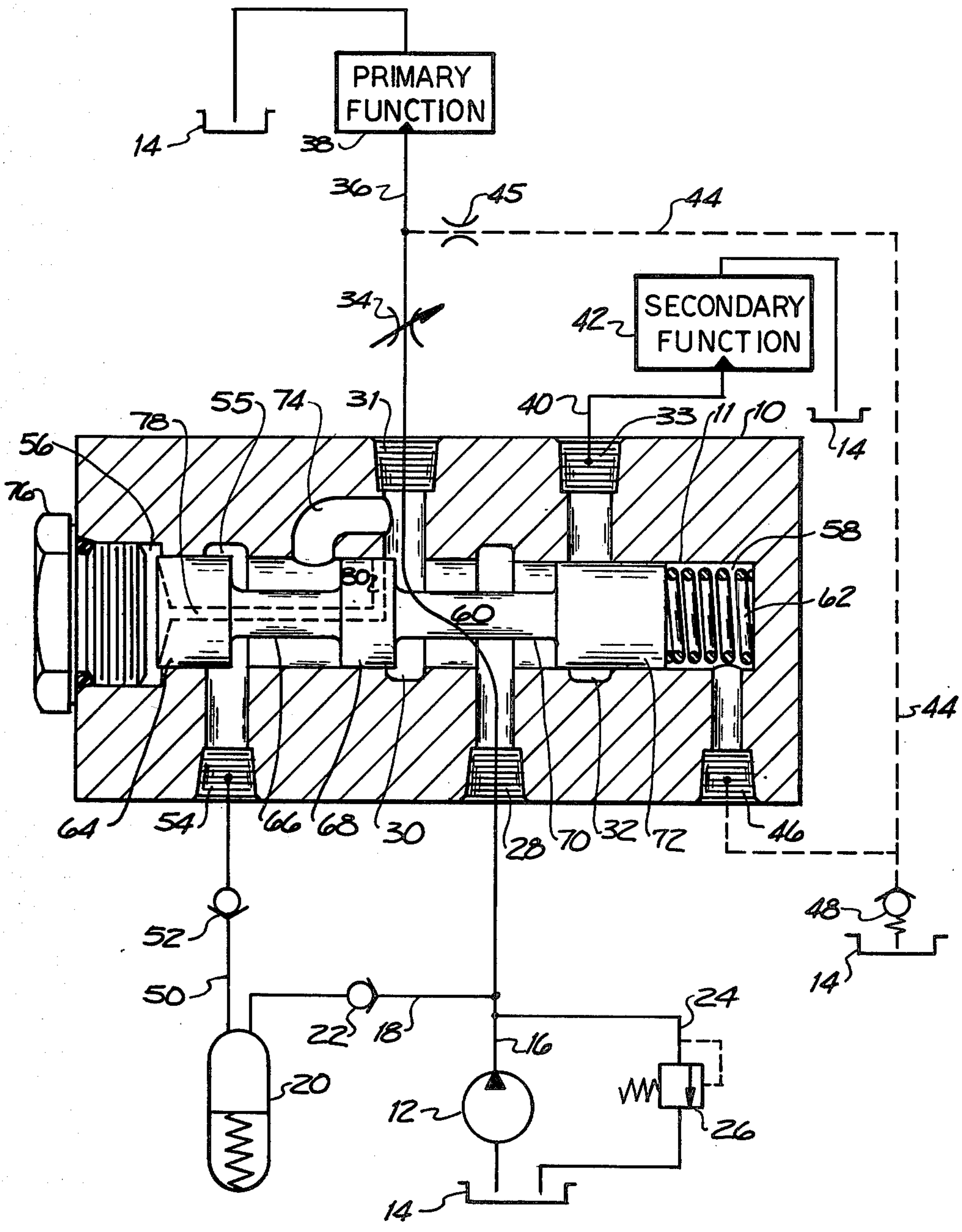
FIG. 1 is a sectional view of the valve in its extreme priority demand position with a schematic view of related parts of a hydraulic circuit.

The priority flow valve of the present invention is for use in a hydraulic circuit fed by either a fixed or variable displacement pump and in a pressure or flow compensated system or a pressure flow compensated system. A priority flow valve body 10 has a longitudinal bore 11 containing a slidably movable spool 60 and a spring 62 which biases the spool 60 toward left end of the bore 11. The spool 60 is positioned by a control servo having opposing servo chambers, a first servo chamber 58 and a second servo chamber 56. The bore 11 intersects a secondary outlet chamber 32, a pump chamber 29, a priority outlet chamber 30, an accumulator chamber 55, and is closed with a plug 76. A first land 72 is on right end of the spool 60 and is located adjacent to the secondary outlet chamber 32. A secondary port 33 connects with the secondary outlet chamber 32. A second land 68 is on midsection of the spool 60 and is located adjacent to the priority outlet chamber 30. A priority port 31 connects with the priority outlet chamber 30. A third land 64 is on left end of the spool 60 and is located adjacent to the accumulator chamber 55. An accumulator port 54 connects with the accumulator chamber 55.A first annular groove 70 is located between the first land 72 and the second land 68. The groove 70 is adjacent to the pump chamber 29 which connects with a pump port 28 and conditionally connects with the secondary port 33 and the priority port 31.

A second annular groove 66 is located between the second land 68 and the third land 64, and connects with the priority port 31 by a connecting passage 74. The groove 66 also conditionally connects with the accumulator port 54. A pump 12 pumps fluid from a sump 14 through a pump line 16 to the pump port 28. The pump 12 also pumps fluid to an accumulator 20 via the line 16 then through an accumulator line 18 and a check valve 22. The accumulator 20 connects with the accumulator port 54 via an accumulator outlet line 50 and a check valve 52. A relief valve line 24 connects the line 16 with a pressure relief valve 26 which vents to the sump 14. The need for the line 24 and the relief valve 26 depends on the type of the pump 12 and how it is compensated. A priority line 36 runs from the priority port 31 through a variable restriction 34 to a primary function 38. The variable restriction 34 could also be a fixed restriction. The primary function 38 is the priority function, the one which has precedence over other functions in its demand for fluid power. A sensing line 44 leads off of the line 36 downstream from the variable restriction 34, through a fixed restriction 45 to a sensing port 46 which connects with the first servo chamber 58 in right hand end of the bore 11. In the sensing line 44 is a pressure relief valve 48 set at a pressure level somewhat below maximum system pressure provided by the pump 12 after taking into account the force provided by the spring 62. A secondary line 40 leads from the secondary port 33 to a secondary function 42. A second servo chamber 56 occupies left end of the bore 11 and connects with the priority outlet chamber 30 via a second servo passage 78, extending lengthwise from left end of the spool 60 to a cross bore 80 on the second land 68. The cross bore 80 connects with the priority outlet chamber 30.

Figure 2:
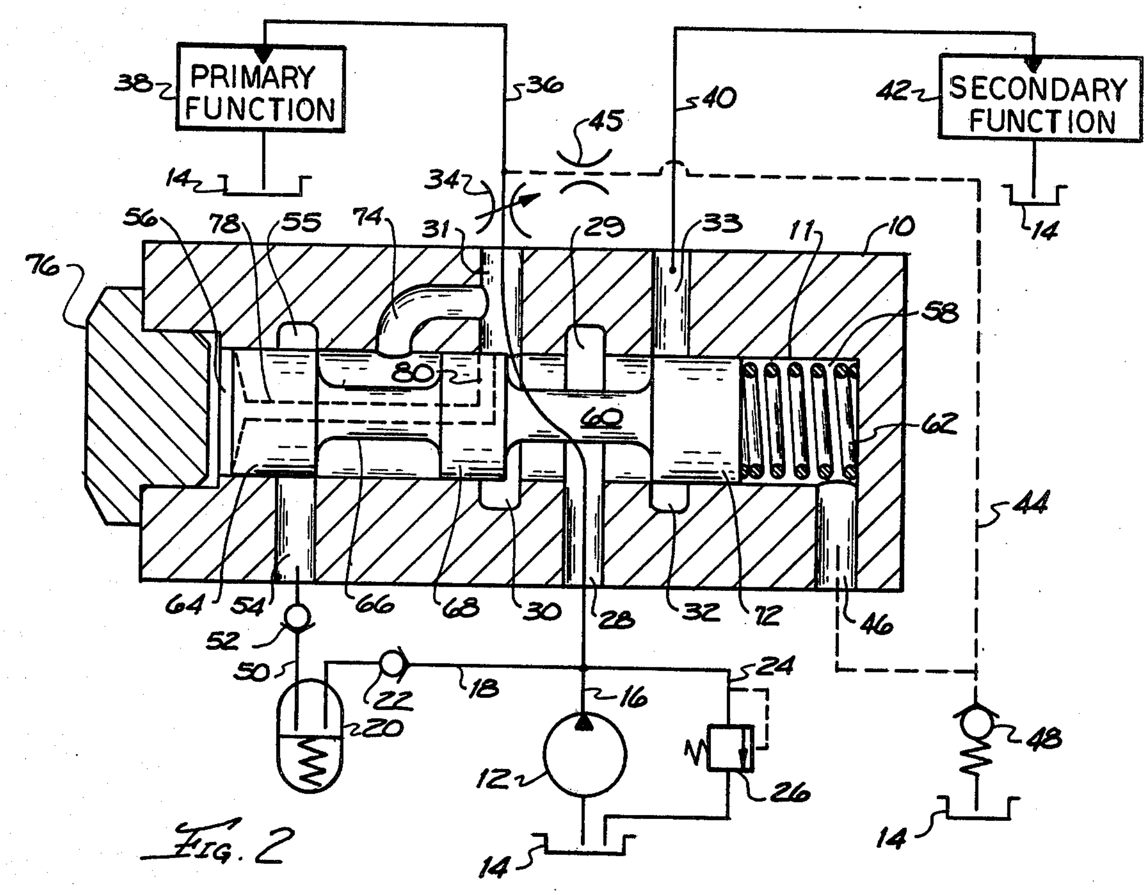
FIG. 2 is a similar view of the valve and the circuit except that the valve is in its normal priority demand position.
Figure 3:
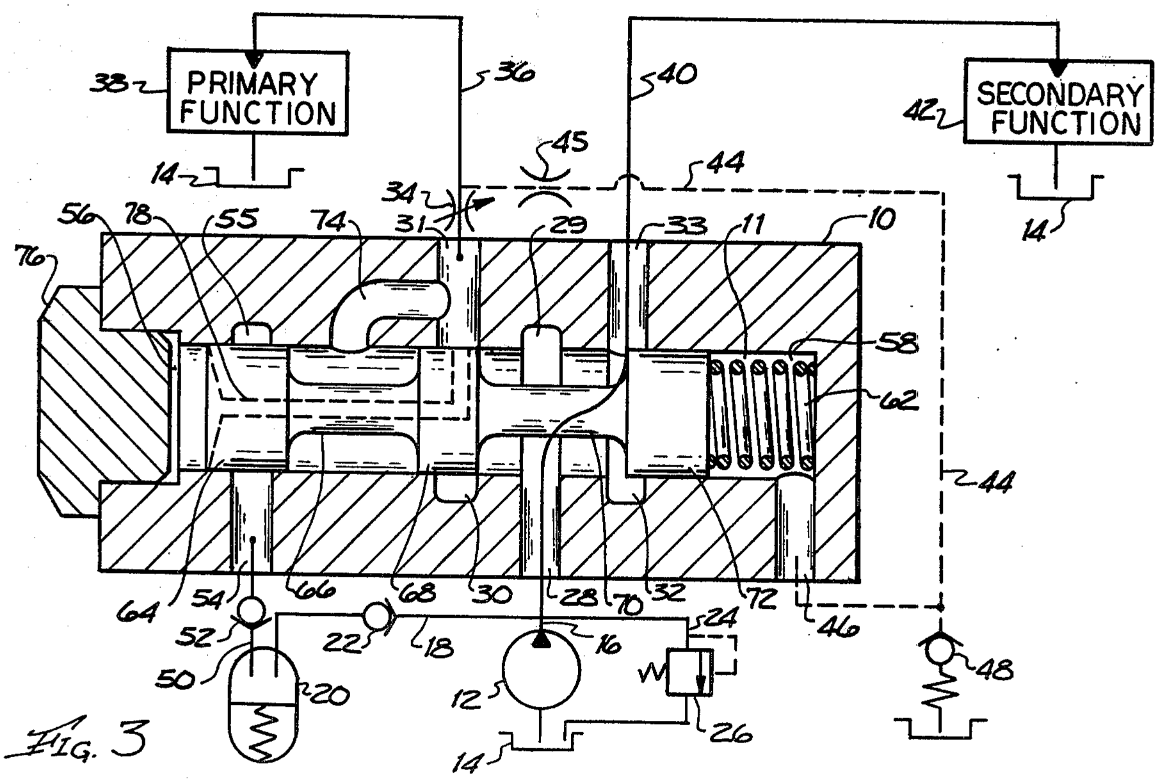
FIG. 3 is also similar to the FIG. 1 view of the valve and circuit except that the valve is in its no-priority demand position.

In operation, fluid from the pump 12 enters the priority valve body 10 at the pump port 28 which connects to the pump chamber 29. In the absence of any flow to the priority function 38, there is no pressure drop across the variable restriction 34 and, therefore, there are equal pressures in the opposing first and second servo chambers 58 and 56 acting on opposite ends of the spool 60. Referring to FIG. 1; in the absence of any pressure differential, the spring 62 maintains the spool 60 in its far leftward position so that the first land 72 blocks any flow to the secondary outlet chamber 32. As flow across restriction 34 increases to the priority function 38, a pressure drop develops across the variable restriction 34 causing a pressure increase in the second servo chamber 56 which is sensing pressure upstream of the variable restriction 34. Once the pressure in the second servo chamber 56 exceeds the combined force of the spring 62 and pressure in the first servo chamber 58, which is sensing pressure downstream from the variable restriction 34, the spoon 60 shifts to the right, opening a flow to the secondary function 42 as the first annular groove 70 opens into the secondary outlet chamber 32, the spool 60 being in a position between that of FIG. 2 and FIG. 3. If the priority flow exceeds a preset flow, such as an overspeed condition, the spool 60 moves farther to the right, to its no-priority demand position, FIG. 3, and the second land 68 further restricts the flow to the priority outlet chamber 30. If the variable restriction 34 is completely closed, blocking all flow to the priority function 38, pressure in the sensing line 44 drops essentially to zero and causes the spool 60 to move to its far rightward position which directs full flow from the pump 12 to the secondary function 42. Refer to FIG. 3.

When the priority function 38 is blocked, for example when a piston bottoms out, it becomes impossible to satisfy the flow requirements signaled by the pressure drop at the variable restriction 34 and thus preventing any flow to the secondary function 42. However, when the priority flow is so blocked the pressure will approach maximum level of the pump 12 causing the relief valve 48 to open which will, with the fixed restriction 45 limiting the flow, keep pressure in the sensing line 44 from going above that set by the relief valve 48. The pressure in the priority port 31 and in the second servo chamber 56 will continue to increase while the pressure in the first servo chamber 58 is stabilized thus creating an artificial pressure drop between the servo chambers 56 and 58 which causes the spool 60 to shift to the right opening the pump chamber 29 to the secondary outlet chamber 32.

The foregoing operation is similar to that of the U.S. Pat. No. 3,979,908. The operation of the present invention comprises, in addition, a phase of storing pressurized fluid in an accumulator 20 and using it to provide for short term peaks in demand by the priority function 38. The pump 12 supplies fluid to the accumulator 20 through the accumulator line 18 and the check valve 22 whenever the pressure in the pump line 16 exceeds that in the accumulator 20. This fluid is then stored in the accumulator 20 until extreme demand of the priority function 38 shifts the spool 60 to its extreme priority demand position, which is its most leftward position. This creates a greater pressure drop across the variable orifice 34 than that developed by a normal priority demand.

Such a position of the spool 60 admits fluid from the accumulator 20 through the accumulator outlet line 50, past the check valve 52, into the accumulator port 54, then into the accumulator chamber 55, and referring to FIG. 1, past the second annular groove 66 through the connecting passage 74 to the priority port 31 which is also being directly supplied by the pump 12 through the pump port 28 past the first annular groove 70.

The drawing and the description describe the invention in sufficient clarity to enable those familiar with the art to construct and use it. It can be seen that many changes can be made in the structure of the preferred embodiment without departing from the concept of this invention.

Having fully described my invention with sufficient clarity to enable those skilled in the art to construct and use it, I claim:

1. An improved priority flow valve of the type used between a fluid power source and functions operated by the source, one of the functions being a priority function connected to the valve through a restriction and at least one other function being a secondary function connected to the valve; the valve having a bore, an inlet chamber connected to the fluid power source, a priority outlet chamber connected to the priority function, a secondary outlet chamber connected to the secondary function; the bore passing through these inlet, priority outlet, and secondary outlet chambers; valve spool means, slidably positioned in the bore by a control servo with opposing chambers, for sensing pressures upstream and downstream from the restriction, a land near each end of the valve spool means, an annular groove located between the two lands and conditionally connecting the inlet chamber with the priority and secondary outlet chambers, and spring means for urging the valve spool means in one direction; wherein the improvement comprises:

- an accumulator chamber adjacent to the bore in the priority flow valve;
- an accumulator connected to the fluid power source and to the accumulator chamber;
- an additional land on the valve spool means;
- an accumulator annular groove on the valve spool means, formed by the additional land, conditionally connecting the priority outlet chamber with the accumulator chamber when the valve spool means is in an extreme priority demand position.

2. An improved priority flow valve as described in claim 1 wherein the chamber of the control servo which senses pressure downstream from the variable restriction has a pressure relief valve to limit pressure in the chamber at a level below maximum pressure of the fluid power source less the effect of the spring means to provide an artificial pressure drop between the opposing chambers of the control servo when the priority function is blocked positioning the valve spool means to direct fluid to the secondary function.

3. An improved priority flow valve as described in claim 1 wherein the chamber of the control servo which senses pressure upstream from the variable restriction is connected by the valve spool means having a longitudinal passage and a cross bore leading to the priority outlet chamber.

4. An improved priority flow valve as described in claim 1 including a check valve between the accumulator and the fluid power source to prevent back flow from the accumulator.

5. In a hydraulic circuit utilized on a mobile vehicle having a fluid power pump supplying a priority function and at least one secondary function, with a restriction in the path to the priority function, there being a priority flow valve comprising a body having a bore therein, a pump chamber intersecting the bore and connected to the pump, a priority outlet chamber intersecting the bore and connected to the priority function, a secondary outlet chamber intersecting the bore and connected to the secondary function, valve spool means for sensing priority demand and slidably positioned in the bore by a control servo having opposing first and second servo chambers, an annular groove on the valve spool means, spring means for urging the valve spool means in one direction, a sensing line connecting the first servo chamber with the priority flow path downstream from the restriction, a fixed restriction in the sensing line limiting flow, a pressure relief valve in the sensing line between the pressure relief valve and the first servo chamber limiting pressure, means for connecting the second servo chamber with the priority outlet chamber upstream from the restriction, the valve spool means having a priority demand position blocking pump flow to the secondary outlet chamber while opening pump flow to the priority outlet chamber, the spring means urging the valve spool means toward the priority demand position, the valve spool means having also a no-priority demand position opening the pump flow to the secondary outlet when the pressure in the second servo chamber exceeds the combined force created by the spring means and the pressure in the first servo chamber, wherein the improvement comprises:

an accumulator chamber in the valve body intersecting the bore and adapted to be connected to an accumulator supplied by said pump;

an accumulator annular groove on the valve spool means conditionally connecting the accumulator chamber with the priority outlet chamber when the valve spool means is in an extreme priority demand position.

* * * * *